United States Patent [19]

Iwasaki

[11] 4,389,581
[45] Jun. 21, 1983

[54] PULSE DUTY CONTROL SYSTEM

[75] Inventor: Shinichiro Iwasaki, Auburn Heights, Mich.

[73] Assignee: Aisin Seiki Company, Limited, Kariya, Japan

[21] Appl. No.: 182,846

[22] Filed: Aug. 29, 1980

[51] Int. Cl.³ .............................................. H02M 5/10
[52] U.S. Cl. .................................................. 307/419
[58] Field of Search ............................... 307/419–421, 307/106; 322/28

[56] References Cited

U.S. PATENT DOCUMENTS

| | | | |
|---|---|---|---|
| 2,883,563 | 4/1959 | Sunderlin | 307/419 X |
| 2,906,895 | 9/1959 | Thomas | 307/421 X |
| 2,950,466 | 8/1960 | Loewe | 307/419 X |
| 3,233,113 | 2/1966 | Apple et al. | 307/419 X |
| 4,155,397 | 5/1979 | Honsinger et al. | 164/5 |

Primary Examiner—Donald A. Griffin
Attorney, Agent, or Firm—Oblon, Fisher, Spivak, McClelland & Maier

[57] ABSTRACT

A pulse duty control system includes a pulse duty controlling element which is formed by a core of an amorphous magnetically soft material and which carries a first and a second coil thereon. A first set of pulses are applied to one end of the first coil while a constant voltage or a second set of pulses are applied to one end of the second coil. The other end of the first coil is connected to an output terminal while the other end of the second coil is connected to a current controlling transistor. An output pulse which is developed at the other end of the first coil has a rising edge which lags behind the rising edge of the first set of pulses by a time delay which corresponds to the degree of conduction of the transistor, and has a falling edge which is substantially synchronized with that of the first set of pulses.

8 Claims, 5 Drawing Figures

PULSE DUTY CONTROL SYSTEM

BACKGROUND OF THE INVENTION

1. Field of the Invention

The present invention relates in general to a novel current or a novel voltage pulse duty control system and, in particular, to a novel pulse duty control system including a pulse duty controlling element formed by a core made of a magnetically soft material which carries a first electrical coil for converting an input pulse into a duty controlled pulse and second electrical coil which controls the duty cycle.

2. Description of the Prior Art

A conventional pulse duty control system is constructed utilizing a pulse width modulation (PWM) electronic circuit. This system additionally requires a power amplifier for relatively high power controlling applications, such as for the constant voltage control of a power supply or motor speed control, in addition to the disadvantage of requiring an increased number of circuit elements. For applications such as controlling a vehicle power supply or a motor, the control system must be located at a vibration-free place which is removed from the apparatus being controlled in order to prevent damage or malfunctioning due to vibrations or noises.

SUMMARY OF THE INVENTION

It is a first object of the present invention to provide a novel pulse duty control system having a reduced number of electronic circuit elements.

A second object of the present invention is to provide a novel pulse duty control system capable of controlling relatively high power with a reduced number of electronic elements.

A third object of the present invention is to provide a novel pulse duty control system having vibration and noise resistance which can be located adjacent to an apparatus being controlled.

These and other objects are achieved in accordance with the present invention by utilizing a core of an amorphous, magnetically soft material as a duty controlling element. The core carries a first electrical coil which converts an input pulse into a duty controlled pulse and a second duty controlling electrical coil. A reference pulse (a first set of pulses) is applied to one end of the first electrical coil; the other end of which represents an output terminal. A constant voltage or a second set of pulses are applied to one end of the second electrical coil; the other end of which is connected to a current controlling element, such as a transistor, to control the impedance or the degree of conduction thereof in accordance with a control signal.

The core of amorphous magnetically soft material is provided in the form of thin sheets since it must be manufactured by quenching from a liquid metal. Magnetically, such material is ferromagnetic and exhibits a high permeability ($\mu max > 10^3$), a low level of magnetic saturation, and a low level coercive force ($< 1.0$ $O_E$). Mechanically, it has a very high fracture strength and excellent resilience and stability. Such magnetically soft materials are described in Hasegawa et al, "Soft Magnetic Properties of Metallic Glasses—Recent Developments", J. Appl. Phys. 50(3), March, 1979, pp. 1551-1556. Magnetically soft materials are sold under the trademark METGLAS (TM) by Allied Chemical Corp.

The use of such amorphous magnetically soft material as the core of the duty controlling element facilitates the manufacture of the element which, in addition, has a high vibration and impact resistance. Of particular importance is the fact that the duty controlling element is capable of achieving control of any desired power level through a suitable choice of size, and the output of the duty controlling element can be directly used to energize an apparatus, circuit, or the like.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
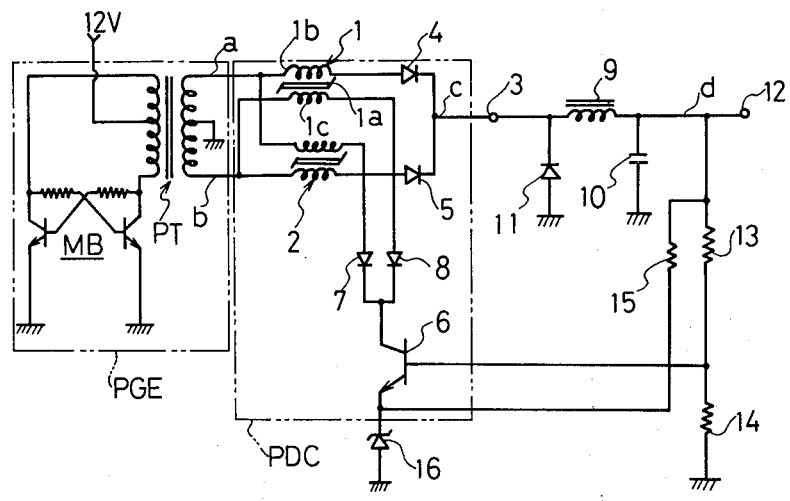
FIG. 1 is a circuit diagram of a first embodiment of the present invention.
Figure 2A:
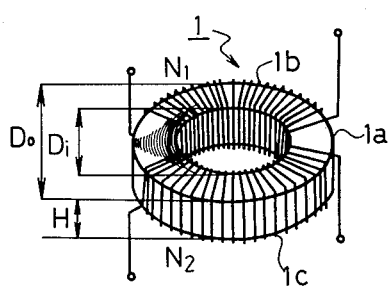
FIG. 2a is a perspective view illustrating the pulse duty controlling element 1 shown in FIG. 1.

Referring now to the drawings, wherein like reference numerals designate identical or corresponding parts throughout the several views, and more particularly to FIG. 1 thereof, a first embodiment of the present invention is shown as including a pulse generator PGE formed by a multivibrator MB, which oscillates at a frequency of 5 kHz, and a pulse transformer PT. Two sets of bipolar pulses a and b (having inverted polarities on the positive and the negative side of zero or ground level) (see FIG. 3) are developed at the output terminals of the pulse generator PGE or at the opposite ends of the secondary winding of the pulse transformer PT. These pulses a and b are applied to a pulse duty control system PDC. The pulse duty control system PDC comprises a pair of duty controlling elements 1 and 2, diodes 4, 5, 7 and 8, and an npn transistor 6 which controls the current level. One of the pulse duty controlling elements 1 is shown in an enlarged perspective view in FIG. 2a. It includes a ring core 1a which is formed from spiral winding of a thin sheet of amorphous magnetically soft material. A first electrical coil 1b and a second electrical coil 1c are disposed on the ring core 1a. The electrical connections of the pulse duty controlling element 1 are shown in FIG. 2b.

Figure 2B:
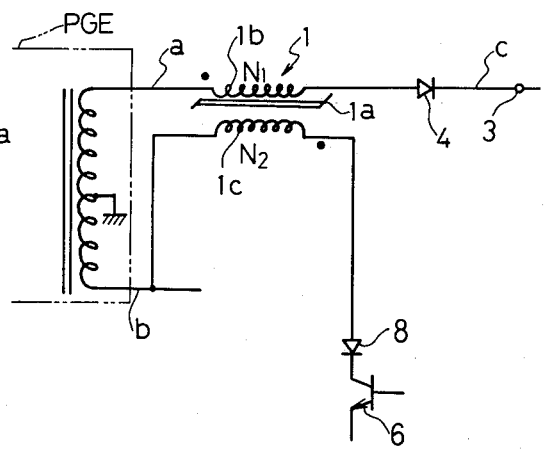
FIG. 2b is a circuit diagram of one of the pulse duty controllers shown in FIG. 1.
Figure 3:
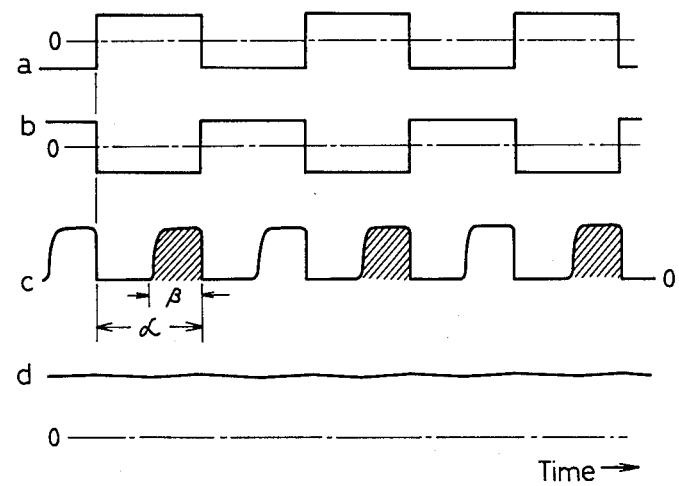
FIG. 3 is a series of timing charts illustrating the waveforms of electrical signals which appear at various points in the circuit of FIG. 1.

Referring to FIG. 2b, the first electrical coil 1b of the element 1 has one end connected to the output terminal of the pulse generator PGE, where the first set of pulses a are developed, and has its other end connected through the diode 4 to the terminal 3, where a duty controlled pulse is developed. The second electrical coil has one end connected to the output terminal of the pulse generator PGE, where the second set of pulses b are developed, and has its other end connected through the diode 8 to the collector of the transistor 6. As a result of this circuit when a positive voltage portion of the pulse a is applied to one end of the first coil 1b, the negative voltage portion of the pulse b is applied to one end of the second coil 1c; however, since the diode 8 is back biased, no current flows through the second electrical coil 1c. Whenever the negative voltage portion of the pulse a is applied to one end of the first coil, the diode 4 is non-conductive to prevent a current flow through the first coil 1b. However, a current flow occurs through the second coil 1c when the positive voltage portion of the pulse b is applied to one end of the second coil 1c, and the transistor 6 is rendered conductive. To summarize, a current flow occurs through the first and the second electrical coils in alternate fashion in synchronism with the pulses a and b. Since the first and the second electrical coils are excited in opposite directions as shown in FIG. 2b, a magnetic flux (or magnetization), which is developed by the energization of the first coil, is reduced or reset by the energization of the second coil. Depending on the degree of conduction of the transistor 6, the current level through the second coil 1c and the reduction of the flux varies. A time interval from the rising end of the input pulse a to the rising end of the output pulse c, or the time delay $\alpha - \beta$ (see FIG. 3) of the rising end of the pulse c relative to that of the pulse a, depends on the reduction of the flux. The time delay $\alpha - \beta$ increases for a high degree of conduction of the transistor 6, and decreases for a lower degree of conduction. In this manner, the pulse duty ratio $\beta/\alpha$ depends on the degree of conduction of the transistor 6. The output pulses from the pulse duty controlling element 1 are the pulses c shown in FIG. 3 which are shown hatched.

In the embodiment shown in FIG. 1, a second pulse duty controller is formed by the second pulse duty controlling elements 2, diodes 5 and 7, and the common transistor 6. In this controller, the pulse b is applied to the first coil of the element 2 while the pulse a is applied to the second coil. As a result, the pulses c shown in FIG. 3 which are not hatched appear at the cathode of the diode 5. In this manner, the first and the second pulse duty controlling elements 1 and 2 produce pulses having the same period as the input pulse a. These pulses have controlled duty cycles and are phase displaced by 180° from each other for application to the output terminal 3. Thus, the pulses c shown in FIG. 3, namely, the pulses having twice the frequency of the input pulse a, which is 5 kHz, are obtained at the output terminal 3; with the duty ratio $\beta/\alpha$ of the pulse depending on the degree of conduction of the transistor 6.

In the arrangement of FIG. 1, a constant voltage control circuit is formed by the combination of the pulse duty control system PDC, a flyback diode 11, a smoothing reactor 9, a smoothing capacitor 10, feedback resistors 13, 14, 15, and Zener diode 16. The Zener diode 16 is connected between the emitter of the transistor 6 and ground. An output voltage d is applied through the resistor 15 to the emitter of the transistor 6, thereby causing a breakdown of the Zener diode 16 to maintain a constant emitter potential. A voltage proportional to the output voltage d is developed across the resistor 14 and is applied to the base of the transistor 6. Accordingly, as the output voltage d decreases, the degree of conduction of the transistor 6 decreases, reducing the level of the currents which flow through the second electrical coils of the elements 1, 2, which in turn reduces the reduction of a flux by the second electrical coils to thereby increase the value $\beta/\alpha$ thus increasing the output voltage d. Conversely, when the output voltage d increases, the degree of conduction of the transistor 6 increases to increase the reduction of the flux, thereby reducing the value $\beta/\alpha$ to reduce the output voltage d.

The inventor of the present invention has determined the magnitude of the output voltage d with the circuit arrangement of FIG. 1. The material and dimensions of the duty controlling elements 1, 2 used are shown in the Table 1 below, and the results of measurements are shown in the Table 2 below.

TABLE 1

| material & dimensions of core 1a of controlling elements 1, 2 | | | | coil 1b | coil 1c |
|---|---|---|---|---|---|
| material | configuration | | | | |
| Atomic Weight % $Fe_{40}Ni_{38}Mo_4B_{18}$ amorphous alloy, thickness of sheet = 0.05 mm | laminated ring core of 110 sheets (FIG. 2a) | | | 50 turns | 40 turns |
| | Di (mm) 6 | Do (mm) 12 | H (mm) 2 | | |

TABLE 2

| load current (A) | 0 | 0.1 | 0.2 | 0.3 | 0.4 | 0.5 | 0.6 | 0.7 | 0.8 | 0.9 | 1.0 | 1.1 | 1.2 | 1.3 | 1.4 |
|---|---|---|---|---|---|---|---|---|---|---|---|---|---|---|---|
| d (V) | 7.54 | 7.52 | 7.51 | 7.51 | 7.51 | 7.50 | 7.50 | 7.50 | 7.50 | 7.50 | 7.49 | 7.49 | 7.49 | 7.49 | 7.48 |
| ripple of d (mVpp) | 5 | 30 | 30 | 40 | 45 | 50 | 50 | 55 | 60 | 60 | 65 | 65 | 70 | 75 | 75 |
| base voltage of transistor 6 (V) | 5.75 | 5.73 | 5.73 | 5.72 | 5.72 | 5.72 | 5.72 | 5.72 | 5.72 | 5.72 | 5.72 | 5.71 | 5.71 | 5.71 | 5.71 |
| emitter voltage of transistor 6 (V) | 5.12 | 5.11 | 5.11 | 5.11 | 5.11 | 5.11 | 5.12 | 5.12 | 5.12 | 5.12 | 5.12 | 5.12 | 5.12 | 5.12 | 5.13 |
| ripple of emitter voltage (mVpp) | 20 | 20 | 20 | 20 | 20 | 20 | 20 | 30 | 30 | 30 | 30 | 30 | 30 | 35 | 35 |
| base-emitter voltage (V) | 0.63 | 0.62 | 0.62 | 0.61 | 0.61 | 0.61 | 0.59 | 0.59 | 0.59 | 0.59 | 0.59 | 0.59 | 0.59 | 0.59 | 0.58 |

The ripple contained in the output voltage d and the emitter voltage shown in Table 2 have a fixed period corresponding to 10 kHz which is synchronized with the pulses c, and assume levels dependent on the parameters of the smoothing reactor 9 and the smoothing capacitor. The data of Table 2 indicates that the output voltage d is stabilized against changes in the load current over an extensive range.

In the constant voltage control circuit shown in FIG. 1, the maximum value of the voltage applied across the second coil 1c is substantially equal to the positive voltage portion of the pulse b from which is subtracted the reference voltage (emitter potential) determined by the Zener diode 16 when the transistor 6 is fully conductive. When the transistor 6 is non-conductive, the voltage applied across the second coil is zero, which is the minimum value. In this manner, this applied voltage varies over an extensive range depending on the degree of conduction of the transistor 6. In other words, the ratio $\beta/\alpha$ can be controlled over an increased range, thus improving the stability of the constant voltage control.

Figure 4:
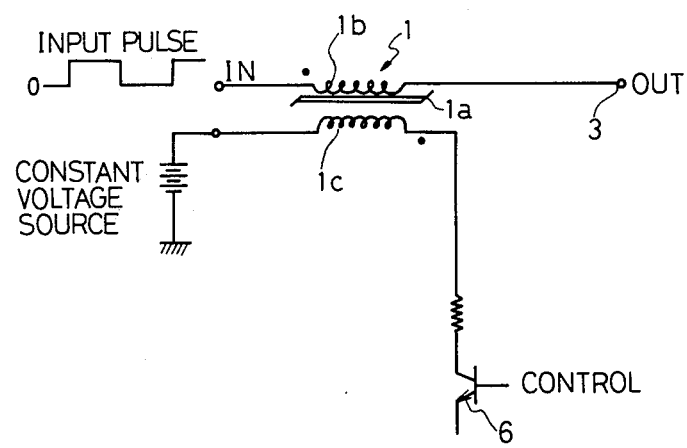
FIG. 4 is a circuit diagram of another embodiment of the present invention.

FIG. 4 shows another embodiment of the present invention. In this instance, a unipolar pulse (meaning a pulse changing between a positive level and ground level) is applied to one end of the first coil while the second coil is connected to a constant voltage source, with the level of the energizing current flowing through the second coil being controlled by the transistor 6. The current level through the second coil is chosen to be in a range substantially below the pulse current flowing through the first coil, such that the flux produced by the first coil is reduced for both the positive and the ground level intervals of the input pulse. This manner of controlling the pulse duty by normally passing a current through the second coil and controlling the level thereof is applicable to the circuit arrangement shown in FIG. 1. By way of example, the terminals of the second coils of the duty controlling elements 1, 2 shown in FIG. 1 may be disconnected from the pulse generator PGE and instead connected to a constant voltage source.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pulse duty control system, comprising:
   pulse generator means for producing a first and a second set of pulses, said first and second set of pulses being phase displaced by 180° from each other;
   a current controlling element having a conduction level controlled in accordance with a control voltage derived from a signal appearing at an output terminal of said system;
   a first pulse duty controlling element including a first core made of an amorphous magnetically soft material having a first electrical coil and a second electrical coil disposed thereon, said first coil having a first terminal coupled to receive said first set of pulses and having a second terminal coupled to said output terminal of said system through a first diode, said second coil having a first terminal coupled to receive said second set of pulses and having a second terminal coupled to said current controlling element; and
   a second pulse duty controlling element including a second core made of an amorphous magnetically soft material having a third electrical coil and a fourth electrical coil disposed thereon, said third coil having a first terminal coupled to receive said second set of pulses and having a second terminal coupled to said output terminal of said system through a second diode, said fourth coil having a first terminal coupled to receive said first set of pulses and having a second terminal coupled to said current controlling element.

2. A pulse duty control system as recited in claim 1, wherein said first and second cores each comprise:
   a ring-shaped laminated core, said laminated core including a spiral winding of a thin sheet of said amorphous magnetically soft material.

3. A pulse duty control system, comprising:
   a pulse duty controlling element including at least one core made of an amorphous magnetically soft material having a first electrical coil and a second electrical coil disposed thereon;
   pulse generator means for applying a pulse to a first terminal of said first electrical coil;
   power supply circuit means for applying a voltage to a first terminal of said second electrical coil;
   current controlling means coupled to a second terminal of said second electrical coil for controlling the level of a current flowing through said second electrical coil in accordance with a control voltage derived from an output terminal of said system;
   smoothing circuit means coupled between a second terminal of said first electrical coil and said output terminal of said system;
   a Zener diode coupled to a first terminal of said current controlling means;
   resistor means coupled between said output terminal of said system and said first terminal of said current controlling means to which said Zener diode is coupled; and
   voltage divider means coupled to said output terminal of said system for dividing an output voltage appearing at said output terminal and for supplying said control voltage to an input terminal of said current controlling means.

4. A pulse duty control system as recited in claim 3, wherein said at least one core comprises:
   a ring-shaped laminated core, said laminated core including a spiral winding of a thin sheet of said amorphous magnetically soft material.

5. A pulse duty control system as recited in claim 3, wherein said power supply circuit means comprises:
   a pulse generator.

6. A pulse duty control system as recited in claim 3, wherein said power supply circuit means comprises:
   a constant voltage supply source.

7. A pulse duty control system, comprising:
   pulse generator means for producing a first and a second set of pulses, said first and second set of pulses being phase displaced by 180° from each other;
   a current controlling element having a conduction level which is controlled in accordance with a control voltage derived from a signal appearing at an output terminal of said system;
   a first pulse duty controlling element including a first core made of an amorphous magnetically soft material having a first electrical coil and a second electrical coil disposed thereon, said first coil having a first terminal coupled to receive said first set of pulses and having a second terminal coupled to an intermediate terminal through a first diode, said second coil having a first terminal coupled to receive said second set of pulses and having a second terminal coupled to said current controlling element;
   a second pulse duty controlling element including a second core made of an amorphous magnetically soft material having a third electrical coil and a fourth electrical coil disposed thereon, said third coil having a first terminal coupled to receive said second set of pulses and having a second terminal coupled to said intermediate terminal through a second diode, said fourth coil having a first terminal coupled to receive said first set of pulses and having a second terminal coupled to said current controlling element;

smoothing circuit means coupled between said intermediate terminal and said output terminal of said system;
a Zener diode coupled to a first terminal of said current controlling element;
a resistor coupled between said output terminal of said system and said first terminal of said current controlling element; and
voltage divider means coupled to said output terminal of said system for dividing an output voltage appearing at said output terminal and for supplying said control voltage to an input terminal of said current controlling element.

8. A pulse duty control system as recited in claim 7, wherein said first and second cores each comprise:
a ring-shaped laminated core, said laminated core including a spiral winding of a thin sheet of said amorphous magnetically soft material.

* * * * *